No. 646,546.  
P. W. PRATT.  
BICYCLE BRAKE.  
(Application filed July 18, 1899.)  
Patented Apr. 3, 1900.
(No Model.)  
2 Sheets—Sheet 1.
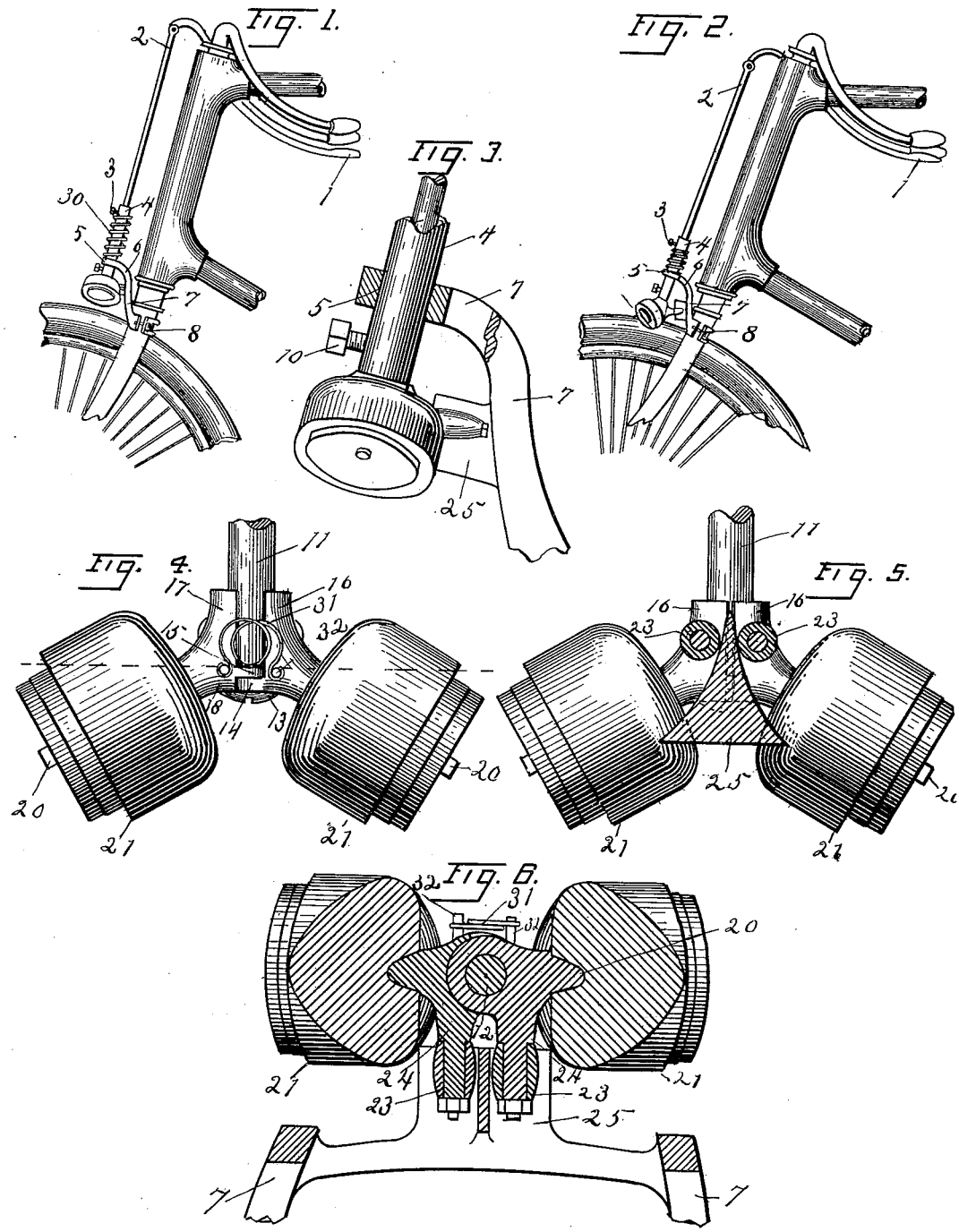
WITNESSES:  
INVENTOR  
Philip W. Pratt  
BY  
ATTORNEY.

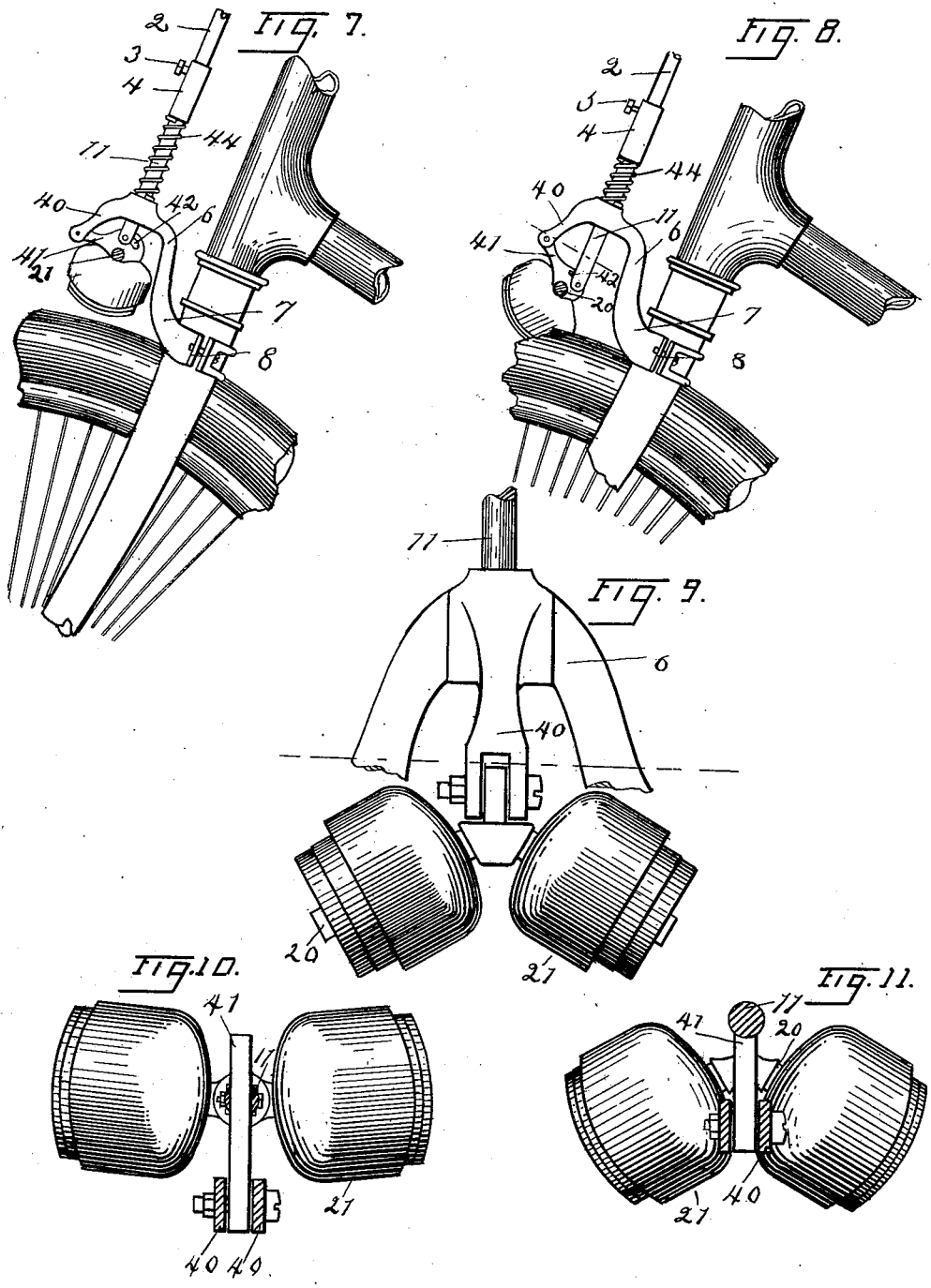

UNITED STATES PATENT OFFICE.

PHILIP W. PRATT, OF SAN FRANCISCO, CALIFORNIA.

BICYCLE-BRAKE.

SPECIFICATION forming part of Letters Patent No. 646,546, dated April 3, 1900.

Application filed July 18, 1899. Serial No. 724,297. (No model.)

*To all whom it may concern:*

Be it known that I, PHILIP W. PRATT, a citizen of the United States, residing at San Francisco, in the county of San Francisco and State of California, have invented certain new and useful Improvements in Bicycle-Brakes, of which the following is a specification.

My invention relates to improvements in brakes, and particularly to bicycle-brakes, the object of my invention being to provide a brake which can be applied very gradually to the tire of the wheel, but which will when fully applied thereto hold said tire with a firm grip and effectually prevent rotation of the wheel. For this purpose I have provided an arrangement of friction-rollers which when first brought into contact with the rubber tire will revolve by friction therewith in the same tangential direction as the wheel, but which as the brake is applied more strongly will change their axes so as to revolve more and more transversely to the wheel, and thus retard the rotary motion thereof.

In the accompanying drawings, Figure 1 is a side elevation of a portion of a bicycle provided with my improvement. Fig. 2 is a similar view of the same with the brake set. Fig. 3 is an enlarged side view of the brake proper. Fig. 4 is a front view thereof. Fig. 5 is a vertical section giving a rear view of the braking-rollers. Fig. 6 is a substantially-horizontal section through the line 6 6 of Fig. 4. Fig. 7 is a side elevation of a modified form of the device, the nearer roller being removed. Fig. 8 is a similar view with the brake set. Fig. 9 is a front view. Fig. 10 is a horizontal section, and Fig. 11 is a similar view with the brake set.

1 represents the brake-lever, fulcrumed in the usual manner upon the handle-bar and attached to the brake-stem 2, on the lower end of which is secured by the set-screw 3 the tube 4, having bearings 5 in a gooseneck 6, the arms 7 of which are clamped, as at 8, on the fork of the front wheel. In the lower end of said tube 4 is secured by a set-screw 10 the rod 11, in the lower end of which is screwed the pivot 12, upon which, between the bottom of the rod 11 and the head 13 of said pivot, are pivoted the collars 14 15, the lower collar 14 extending upward to form a segmental neck 16 around the rod 11 and also around the collar 15, and the upper collar 15 having a similar upwardly-extending neck 17 and a downwardly-extending segmental neck 18 around the collar 14. From said collars extend downwardly, but in the plane perpendicular to the direction of motion of the tire, the axles 20 of friction-rollers 21, and from said roller-axes being in said perpendicular plane when first brought into contact with the tire it follows that they then roll freely with said tire and exert an inappreciable retardation thereon; but as the brake-stem is still further depressed antifriction-rollers 23, carried on arms 24, extending rearwardly from the necks 16 17, move along the downwardly-diverging faces of a wedge 25, extending from a cross-piece connecting the arms 7 of the gooseneck. By the consequent spreading of the arms 24 the axles 20 are moved into a forward direction and the rollers no longer move in harmony with the tire, but crosswise or at variance therewith, and exert a retarding effect on the tire. When the pressure is released, a spring 30 around the tube 4 raises the brake-handle, and a spring 31, having its ends secured on pins 32, projecting from the necks 16 17, throws said necks and the friction-rollers backward into their normal positions.

In the modification of the invention shown in Figs. 7 to 11 the gooseneck 6 has a forward extension or nose 40, to which is pivoted an arm 41, extending rearwardly and having at its rear end the downwardly-diverging axles 20, carrying rollers 21. Said arm 41 is slotted, as at 42, and the lower end of said rod 11 is loosely pivoted in said slot. Normally the axles 20 extend slightly behind the plane perpendicular to the direction of motion of the tire; but when the brake-stem is depressed the arm 41 swings downwardly and forwardly, so that said axles are in said perpendicular plane when the rollers first come into contact with the tire, and the rollers roll freely thereon, and then as the arm 41 swings still more downwardly and forwardly the axles 20 have also a forward inclination, increasing with the setting of the brake, so that when the brake is fully set the rollers roll across the tire instead of in the same direction. A spring 44, as before, returns the brake to its normal position when pressure is removed.

I claim—

1. In a brake, the combination of rollers, downwardly-extending axles therefor, said axles at the first contact of the rollers with the tire extending in a plane perpendicular to the direction of motion of the latter, and means for moving said axles into a forward direction, whereby said rollers then roll transversely to the motion of the tire, substantially as described.

2. In a brake, the combination of rollers, axles therefor, said axles at the first contact of the rollers with the tire extending in a plane substantially perpendicular to the adjacent portion of said tire, whereby said rollers then exert an inappreciable retardation thereon, and means for simultaneously pressing said rollers against the tires and changing the direction of the axles so as to become more and more oblique to said perpendicular plane whereby said rollers then roll more and more transversely to the tire, substantially as described.

3. In a brake, the combination of rollers, downwardly-diverging axles therefor, and means for simultaneously pressing said rollers against a tire and increasing the angle which their planes of rotation make with the plane of rotation of the tire, substantially as described.

In witness whereof I have hereunto set my hand in the presence of two subscribing witnesses.

PHILIP W. PRATT.

Witnesses:
FRANCIS M. WRIGHT,
CHAS. W. SMYTH.